US008868607B2

(12) United States Patent
Apsel

(10) Patent No.: US 8,868,607 B2
(45) Date of Patent: Oct. 21, 2014

(54) PRIVILEGED USER ACCESS MONITORING IN A COMPUTING ENVIRONMENT

(75) Inventor: Ira W. Apsel, Mt. Sinai, NY (US)

(73) Assignee: American International Group, Inc., New York, NY (US)

( * ) Notice: Subject to any disclaimer, the term of this patent is extended or adjusted under 35 U.S.C. 154(b) by 405 days.

(21) Appl. No.: 12/562,945

(22) Filed: Sep. 18, 2009

(65) Prior Publication Data
US 2011/0072519 A1 Mar. 24, 2011

(51) Int. Cl.
G06F 17/30 (2006.01)
G06F 21/64 (2013.01)

(52) U.S. Cl.
CPC ..................................... *G06F 21/64* (2013.01)
USPC ........... 707/783; 707/785; 707/786; 707/787; 707/789

(58) Field of Classification Search
USPC .................. 707/783, 784, 785, 786, 787, 788
See application file for complete search history.

(56) References Cited

U.S. PATENT DOCUMENTS

| 5,937,413 | A  | * | 8/1999  | Hyun et al. ........................... 1/1 |
| 6,363,391 | B1 | * | 3/2002  | Rosensteel, Jr. ..................... 1/1 |
| 7,051,052 | B1 | * | 5/2006  | Shapiro et al. ................ 707/610 |
| 8,307,001 | B2 | * | 11/2012 | Ager et al. ..................... 707/783 |
| 2001/0018747 | A1 | * | 8/2001 | Bouthors ....................... 713/201 |
| 2004/0024736 | A1 |   | 2/2004 | Sakamoto et al. |
| 2005/0231746 | A1 | * | 10/2005 | Parry et al. .................. 358/1.13 |
| 2005/0289072 | A1 |   | 12/2005 | Sabharwal |
| 2007/0162596 | A1 | * | 7/2007 | Sekiguchi ..................... 709/224 |

OTHER PUBLICATIONS

PCT International Searching Authority, Search Report and Written Opinion issued in PCT/US10/48901, Nov. 1, 2010.
International Bureau of WIPO, The, International preliminary report on patentability relative to related PCT international application No. PCT/US2010/048901 mailed Mar. 29, 2012.

* cited by examiner

*Primary Examiner* — Baoquoc N To
(74) *Attorney, Agent, or Firm* — Leydig, Voit & Mayer, Ltd.

(57) ABSTRACT

Methods and systems for monitoring privileged user access of a database using a computer having at least one processor are provided. The system monitors database transactions. If a transaction is made by a privileged user, the system records information relating to the transaction in an audit database and/or in an audit file. If a transaction is made by a terminated or otherwise unauthorized privileged user, the system can be adapted to alert management of a possible security breach.

15 Claims, 4 Drawing Sheets

PRIVILEGED USER ACCESS MONITORING IN A COMPUTING ENVIRONMENT

FIELD OF THE INVENTION

This disclosure relates generally to the monitoring, recording and auditing of user access to a computing system and more particularly to the monitoring, recording and auditing of privileged user access to a relational database management system.

BACKGROUND OF THE INVENTION

Computer users, such as, corporations and governmental entities increasingly store critical data in computing systems. One common computing system for storing large amounts of critical data is a relational database management system (RDBMS). Generally, an RDBMS stores multiple databases. Generally a database supports a single business application and is comprised of one or more tables. A table stores data in logical horizontal rows. The table columns represent fields. To allow for retrieval of desired data, at least one key column is provided that contains unique values such that no two rows contain the same values in a particular key column. For example, in a database storing customer financial information, a column field may be an account balance and the key column may be the customer's social security number or account number.

A front end program typically provides users access to the database. For example, an operator in a call center may use a customer resource management (CRM) program to access data stored in an RDBMS. A user typically can only view and modify certain information stored in the database and cannot create new databases, tables or fields. The user's access to the database may be monitored through the front end program.

Databases in such RDBMS' can store sensitive information, such as financial records, health records and insurance records. Corporations often seek to safeguard the information stored in computing systems against accidental and intentional modification. One approach is to limit access rights to the RDBMS by creating a subset of users who are privileged users with the ability to access features of backend of the RDBMS.

Certain database maintenance tasks are typically performed by a privileged user, such as a database administrator (DBA), with direct access to the database. A privileged user may access an RDBMS to, for example, create new databases, tables, fields or modify data. A privileged user may use administrative front end programs to perform the maintenance tasks or may directly access the RDBMS using structured query language (SQL). A privileged user may have access to view, modify and delete any data in the RDBMS.

Corporations increasingly must monitor privileged user access to corporate computing systems. Intentional data theft of personal information places a corporation's customers at risk of identity theft. Additionally, employees have inappropriately accessed celebrity's personal information. In response to these and other situations, the government requires that corporations track access to certain types of financial and other data. For example, under the Sarbanes-Oxley Act, companies must evaluate and enact certain controls to prevent and detect fraud.

BRIEF SUMMARY OF THE INVENTION

This disclosure is directed to providing a robust solution for monitoring user access to critical data spread across multiple computing systems. The disclosure describes methods and systems for monitoring user access of a computing system and more particularly monitoring privileged user access of an RDBMS.

In one embodiment, a method of monitoring privileged user access of a database using a computer having at least one processor is provided. The method comprises processing a transaction on a monitored database, comparing a user identification for the transaction with a privileged user table resident on the computer, matching the user identification for the transaction with an entry stored in the privileged user table and writing data in an audit trail table containing the user identification associated with the transaction.

In another embodiment, a computer system for monitoring user access of a first database is provided. The computer system comprises a memory storing the first database, a second memory storing a second database containing user identification data for at least one privileged user, at least one processor programmed to monitor user access of the first database and to match a user identification string corresponding to the user access of the first database with user identification data stored in the second database, wherein the at least one processor writes audit data to a third database containing audit trail data when the user identification string corresponding to the user access of the first database matches user identification data stored in the second database.

In yet another embodiment, a computer-readable storage medium storing instructions for monitoring privileged user access of a database is provided. The computer-readable storage medium comprises instructions for processing a transaction on a monitored database, instructions for comparing a user identification for the transaction with a privileged user table resident on the computer, instructions for matching the user identification for the transaction with an entry stored in the privileged user table, and instructions for creating a record in an audit trail table containing the user identification and a representation of modified data associated with the transaction.

DETAILED DESCRIPTION OF THE INVENTION

The present disclosure relates to a method and system for monitoring privileged user access of a computing system, and more particularly, for monitoring privileged user access of a relational database management system. In one embodiment, the described systems and methods provide a homogenous solution to auditing heterogeneous RDBMS. Using the described system, RDBMS from multiple vendors can be monitored. A privileged user can include any individual with database permissions meeting a determined criteria. For example, a database administrator with permissions to create new databases, tables, fields or modify data within a database may be classified as a privileged user. In an alternative embodiment, an individual with permission to modify data within a database may be considered a privileged user. A privileged user can be classified based on any combination of permissions and/or other factors.

Figure 1:
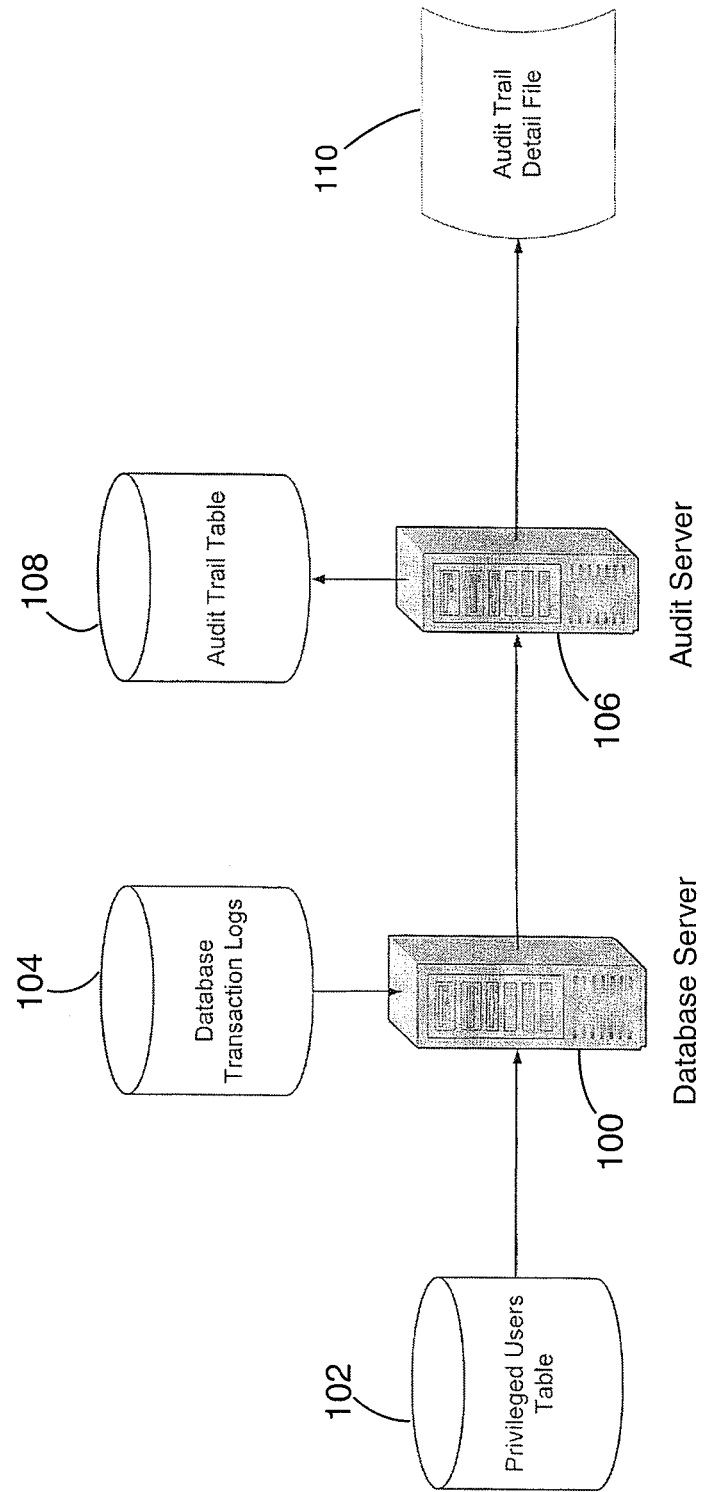
FIG. 1 is a logical block diagram of an exemplary computing system for monitoring privileged user access of a database.

Turning to the figures, FIG. 1 illustrates an exemplary computing environment hosting an RDBMS and associated privileged user access monitoring system. A database server 100 hosts a relational database. The database server 100 may be a separate physical server, a cluster of physical servers, a virtual server within a larger computing environment and/or other physical or logical computing system capable of hosting a database. In one embodiment the database server 100 hosts a relational database storing financial data.

The database server 100 can process transactions from various users, each with a unique user identification. The database server 100 compares the user identification associated with each transaction with a privileged users table 102 that contains a listing of privileged users. In one embodiment, the privileged users table 102 resides on the database server 100. In alternative embodiments, the privileged users table resides on servers other than the database server 100, and the database server 100 queries the server hosting the privileged users table 102. The privileged users table 102 may be its own database, a table in the monitored relational database or reside as a separate data structure not associated with a relational database.

In one embodiment, an agent running on the database server 100 monitors database transaction logs 104 from the monitored database. The transaction log 104 includes information concerning the transactions processed on the database server including the user identification associated with the user that performed each transaction. The agent compares the user identification associated with each transaction in the transaction log 104 with the privileged users table 102. In an alternative embodiment, the agent runs on a server separate from the server hosting the monitored database.

When a user identification associated with a transaction in the database transaction logs 104 matches an entry in the privileged users table 102, the database server 102 transmits audit information to the audit server 106. The audit server 106 writes the audit information to the audit trail table 108. The audit server 106 can be adapted to record various types of information depending on the needs of corporation. In an exemplary embodiment, the audit server 106 creates a record in the audit trail table 108 containing the user identification, the date and time of the transaction and a complete text representation of all inserted and/or deleted rows associated with the transaction. If a user performs a transaction that modifies data in an existing row, the audit server 106 can include a text representation of a before image and an after image of each effected row. In one embodiment, the database server 100 and the audit server 106 are implemented using a single processor.

In one embodiment, the audit trail table 108 resides on the audit server 106. In alternative embodiments, the audit trail table resides on servers other than the audit server 106, and the audit server 106 transmits data to the appropriate server to write to the audit trail table 108. The audit trail table 108 may be its own database, a table in the monitored relational database, or a separate data structure not associated with a relational database. In one embodiment, the audit trail table 108 is part of a relational database and the audit server 106 also writes the audit data, or a subset or superset of the audit data, to an audit trail detail file 110. The audit trail detail file 110 may be a flat text, comma separated file. In an alternative embodiment, the audit server 106 writes audit data to the audit trail detail file 110, but does not write data to a audit trail table 108.

Figure 2:
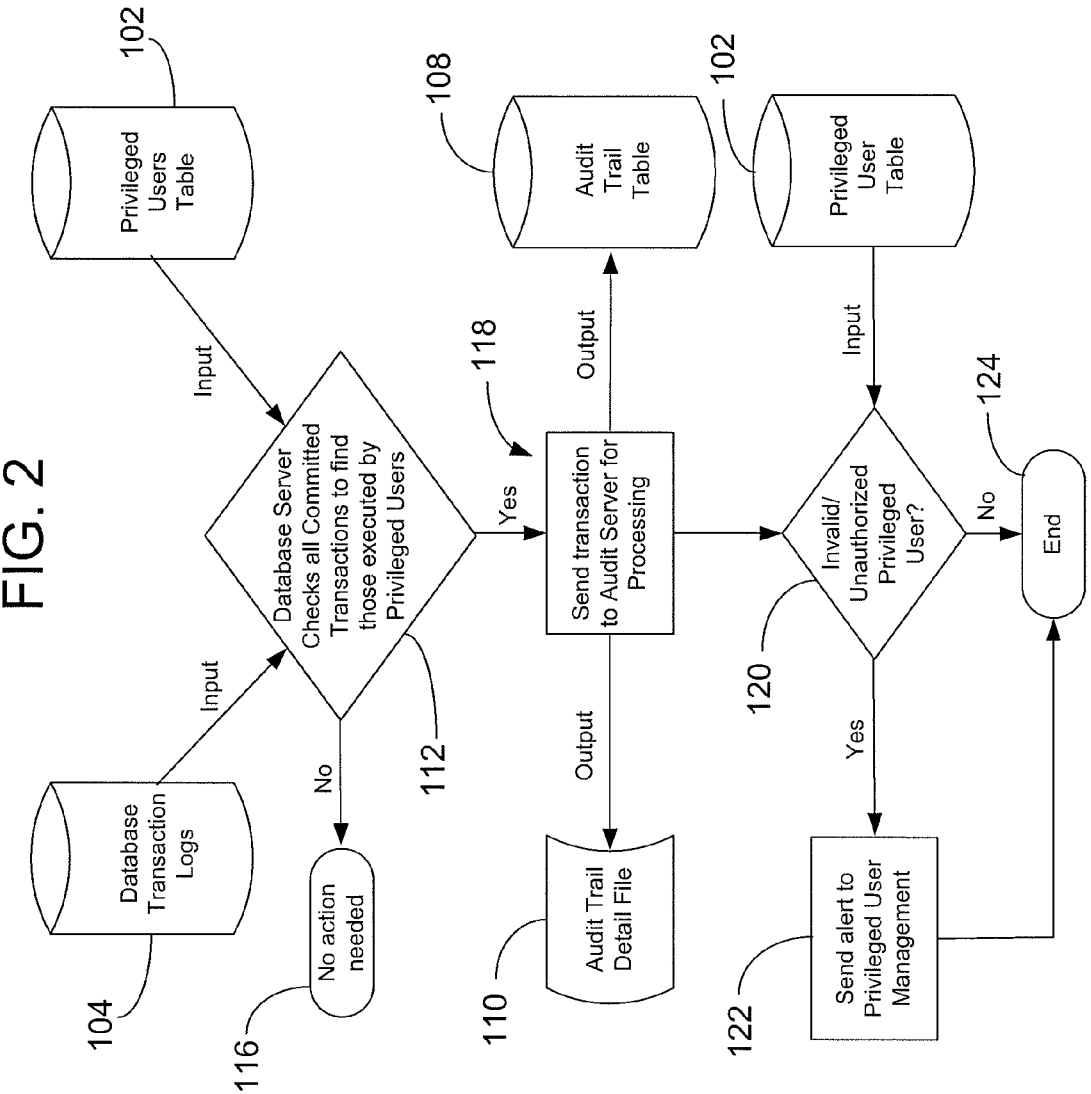
FIG. 2 is a flow diagram for an exemplary method for using a system that monitors privileged user access of a database and records audit information associated with the privileged user access.

FIG. 2 illustrates an exemplary flow diagram of a method for using a system, such as the system of FIG. 1, to monitor privileged user access of a database and to record audit information associated with the privileged user access. At decision point 112, the database server 100 determines changes that were made to the database. In one embodiment, the database server 100 checks all committed transactions to find those executed by privileged users. The database server 100 may use an agent running on the server to perform the check. The database server 100 uses the privileged users table 102 and the database transaction logs 104 to determine which changes to the database were made by privileged users.

At decision point 112, if the transaction was not committed by a privileged user, the procedure ends at point 116. If the transaction was committed by a privileged user, the system moves to step 118. During step 118, the system sends the transaction to the audit server 106 to be processed. In this embodiment, the audit server 106 writes a transaction record to the audit trail table 108. The transaction record can include any predetermined type of information concerning the transaction, such as, the user identification, the date and time of the transaction and a complete text representation of all inserted and/or deleted rows associated with the transaction. If a user performs a transaction that modifies data in an existing row, the audit server 106 can be programmed to include a text representation of a before image and an after image of each affected row. In this embodiment, the audit server 106 also writes the details of the transaction to the audit trail detail file 110.

After writing to the audit trail files, at decision point 120 the system determines if the transaction was completed by a privileged user that had been terminated and/or lost his rights to perform the committed transaction at the time of the transaction by checking the privileged users table 102. In this embodiment, the privileged users table 102 maintains a row for each privileged user. In this embodiment, fields in the privileged user table can include the user identification of privileged users, the name of privileged users, the employment status of privileged users and the privileges given to each privileged user. If a privileged user is terminated or loses privileges for some other reason, the employment status field in that user's row can be updated to indicate such occurrence. However, the row is not deleted. If a transaction was completed by a terminated privileged user or a privileged user that is not authorized to perform that particular transaction, an alert is sent to management at step 122. If a valid privileged user completed the transaction, then the process terminates at step 124.

Figure 3:
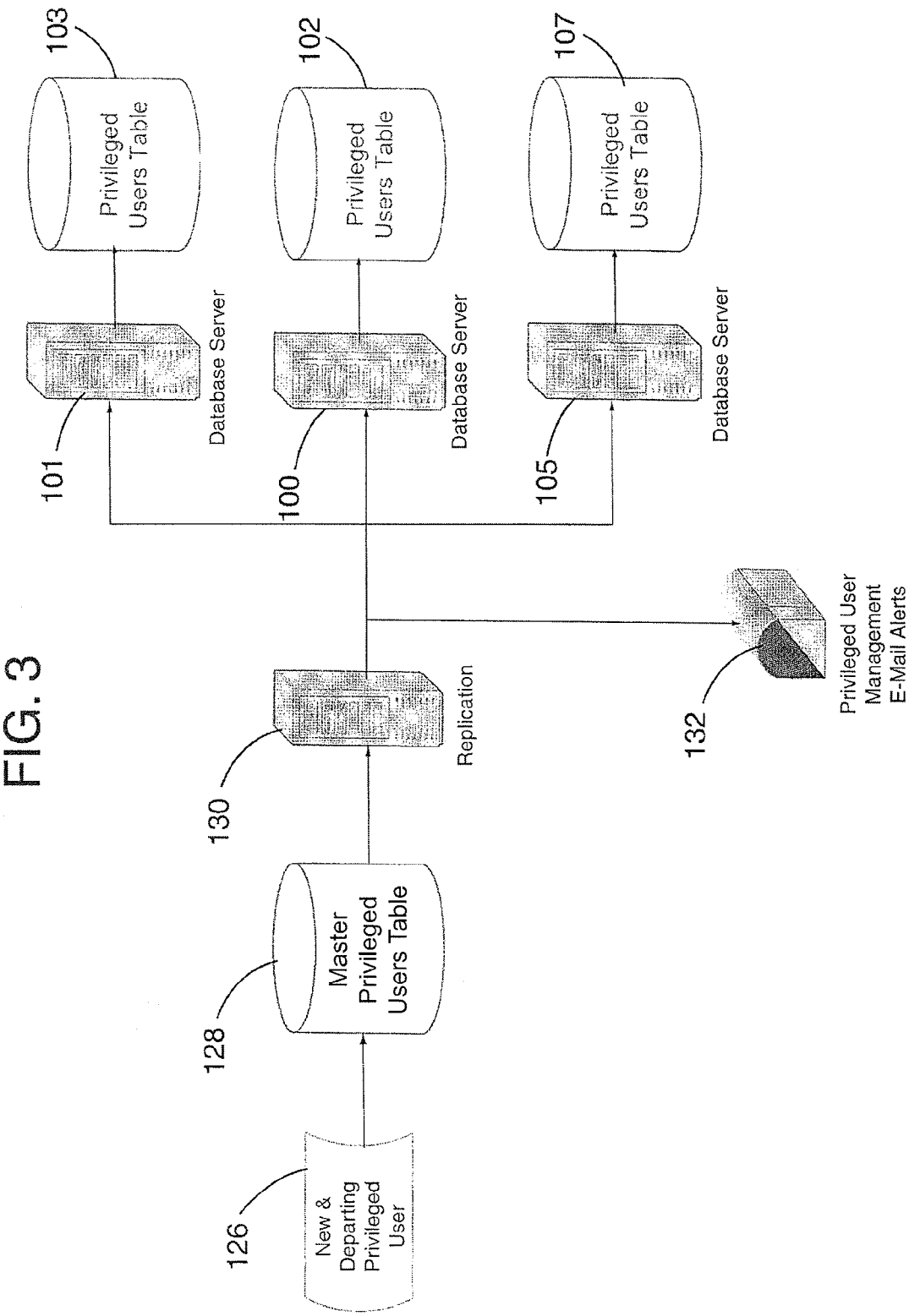
FIG. 3 is a flow diagram of an exemplary process for managing database administrators with privileged user access of a database.

FIG. 3 illustrates an exemplary process for managing database administrators with privileged user access of a database. When a privileged user, such as a DBA, needs to be added or removed from the listing of privileged users, the privileged user data 126 can be entered into the master privileged users table 128. In this embodiment, only an authorized user can enter data into the privileged user table 128. The privileged user data 126 can be entered using any suitable means such as using SQL statements or a frontend application to communicate with the master privileged users table 128. The master privileged users table 128 can be stored on any appropriate server, including database servers. In this embodiment, a replication server 130 replicates the master privileged users table 128 to a database server 100, which stores local copies of the privileged users table 102. The replication server 130 may also replicate the master privileged users table 128 to additional database servers 101 and 105. Database server 101 stores a local copy of the privileged users table 103 and database server 105 stores a local copy of the privileged users table 107. In one embodiment, multiple database servers use a single privileged users table.

The replication server 130 may also email an alert 132 to privileged user management personal when the master privileged user table 128 is modified. The alert allows privileged user management to track changes to the master privileged user table 128 and allows management to detect any unauthorized changes.

In one embodiment, the monitored database exists in a replication environment. Replication allows multiple database servers to host copies of the same database. Replication can help ensure consistency of the data between the redundant databases on the various database servers. Replication can allow for better database access times, while providing hardware and software fault tolerance.

Figure 4:
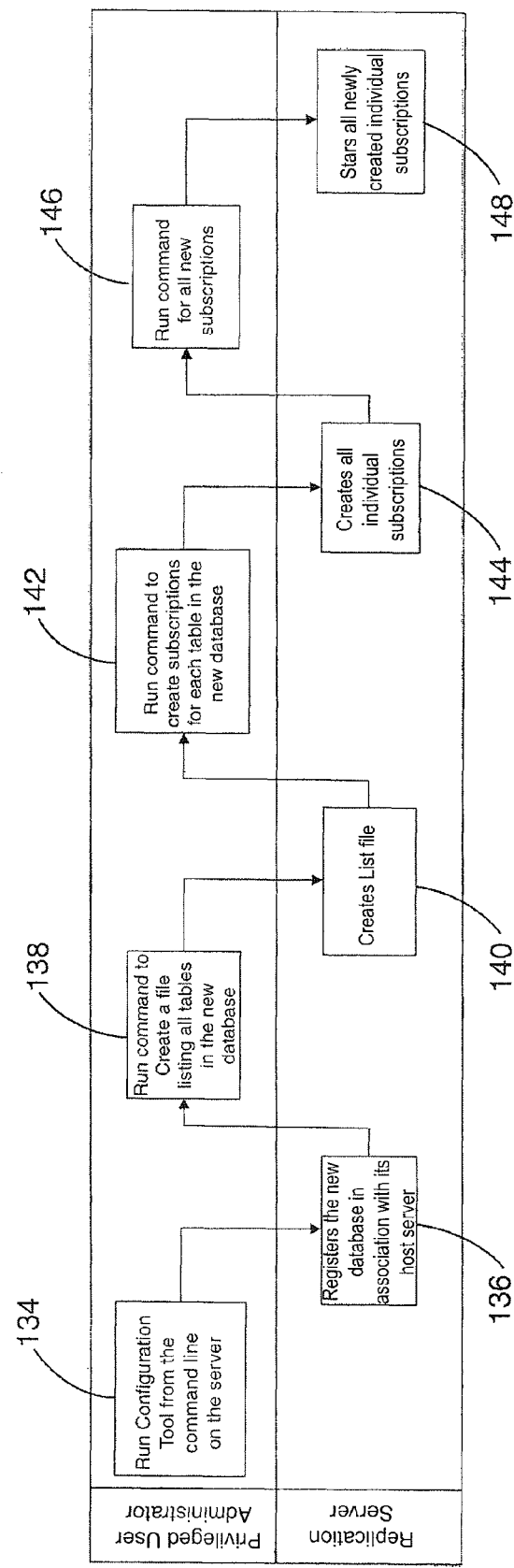
FIG. 4 is a flow diagram of an exemplary process for creating new monitored databases in a replication environment.

FIG. 4 illustrates an exemplary process for configuring a monitored database for replication. At step 134, a person authorized to administer the replication server configures the replication server for the monitored database. At step 136, the replication server registers the new database and its associated database server hardware. At step 138, the person authorized to administer the replication server runs a command on the replication server to create a listing of all tables in the monitored database. In response, the replication server creates a list file at step 140. At step 142, the person authorized to administer the replication server runs a command to create subscriptions for each table in the monitored database that is designated for replication. At step 144, the replication server creates each subscription. At step 146, the person authorized to administer the replication server commands the replication server to start replicating the new database based upon the subscriptions. At step 148, the replication server begins replicating the monitored database.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A computer system for monitoring user access of a first database, the computer system comprising:
   at least one memory device storing the first database and a second database, the first database comprising data, the second database containing user identification data, the user identification data including a unique user identification string for a number of users, the users including at least one privileged user;
   at least one processor programmed to monitor database transactions associated with the first database made by the users, each database transaction having one of the user identification strings associated therewith to identify the user that performed said database transaction, and programmed to determine using the second database whether each data base transaction comprising a change to the data in the first database was performed by a privileged user;
   wherein the at least one processor is programmed to write audit trail data to a third database containing audit trail data for each database transaction changing the data in the first database and determined to have been made by a privileged user, the audit trail data including the user identification string associated with said database transaction and information about the nature of the database transaction, including the date and time of the database transaction and a text representation of inserted text and/or deleted text associated with the database transaction;
   wherein the at least one processor is programmed to determine, for each database transaction identified as being committed by a privileged user, whether the privileged user that committed the database transaction was authorized to perform said transaction at the time the transaction was committed and to send an alert message to at last one designated member of a management group when the user that committed the database transaction was unauthorized to perform said transaction at the time the transaction was committed.

2. The computer system of claim 1, wherein the at least one processor is distributed across at least two servers.

3. The computer system of claim 1, wherein a database server houses a first processor programmed to monitor user access of the first database and an audit server houses a second processor programmed to write audit data.

4. The computer system of claim 1, wherein the at least one processor is a logical processor in a virtual environment.

5. The computer system of claim 1 further comprising:
   a master user identification database;
   wherein the second database containing user identification is replicated from the master user identification database.

6. The computer system of claim 5, wherein the at least one processor comprises a replication processor housing the master user identification database and multiple database processors each hosting a copy of the master user identification database replicated by the replication processor.

7. A method of using a computer system to monitor privileged user access of a database housing data and to record audit information associated with the privileged user access, the method comprising the steps of:
  using a database processor to monitor database transactions committed in the database by various users including at least one privileged user, each user having a unique user identification, and each database transaction having associated therewith the unique user identification of the user who committed said database transaction;
  using the database processor to identify each database transaction comprising a change to the data in the database and committed by a privileged user;
  using the database processor to transmit audit information to an audit processor for each database transaction identified as comprising a change to the data in the database and being committed by a privileged user;
  using the audit processor to write said audit information to an audit trail table, including the date and time of the database transaction and a text representation of inserted text and/or deleted text associated with the database transaction;
  using the audit processor to determine, for each database transaction identified as being committed by a privileged user, whether the privileged user that committed the database transaction was authorized to perform said transaction at the time the transaction was committed; and
  using the audit processor to send an alert message to at last one designated member of a management group when the audit processor determines a database transaction was committed by a privileged user who was not authorized to perform said transaction at the time the transaction was committed.

8. The method of claim 7, wherein the database processor monitors database transactions committed on the database by using an agent running on the database processor to monitor a database transaction log, the database transaction log including information concerning the database transactions committed in the database including the user identification associated with the user that committed each database transaction.

9. The method of claim 7, wherein the database processor identifies each database transaction committed by a privileged user by comparing the user identification associated with each database transaction with a privileged users table that contains a listing of the unique user identifications of the privileged users.

10. The method of claim 9, further comprising the step of:
  generating the privileged user table from a master privileged user table.

11. The method of claim 10, wherein the step of generating the privileged user table from the master privileged user table includes replicating the master privileged user table.

12. The method of claim 7, wherein the audit information comprises a record in the audit trail table containing a representation of modified data associated with the database transaction.

13. The method of claim 7, wherein the step of writing data in an audit table includes storing an image of a first value of a data field before the database transaction was committed and a second value of the data field after the databases transaction was committed, wherein the first value is different than the second value.

14. The method of claim 7, wherein the database processor and the audit processor comprise a single processor.

15. A non-transitory computer-readable storage medium storing instructions for monitoring privileged user access of a database housing data, the computer-readable storage medium comprising:
  instructions for using a database processor to monitor database transactions committed in the database by various users including at least one privileged user, each user having a unique user identification, and each database transaction having associated therewith the unique user identification of the user who committed said database transaction;
  instructions for using the database processor to identify each database transaction comprising a change to the data in the database and committed by a privileged user;
  instructions for using the database processor to transmit audit information to an audit processor for each database transaction identified as comprising a change to the data in the database and being committed by a privileged user;
  instructions for using the audit processor to write said audit information to an audit trail table, including the date and time of the database transaction and a text representation of inserted text and/or deleted text associated with the database transaction;
  instructions for using the audit processor to determine, for each database transaction identified as being committed by a privileged user, whether the privileged user that committed the database transaction was authorized to perform said transaction at the time the transaction was committed; and
  instructions for using the audit processor to send an alert message to at last one designated member of a management group when the audit processor determines a database transaction was committed by a privileged user who was not authorized to perform said transaction at the time the transaction was committed.

* * * * *